US010852073B2

(12) United States Patent
Domeniconi

(10) Patent No.: US 10,852,073 B2
(45) Date of Patent: Dec. 1, 2020

(54) THERMAL ROLLER AND PRODUCING PROCESS

(71) Applicant: GTK TIMEK GROUP SA, Rivera-Monteceneri (CH)

(72) Inventor: Lorenzo Domeniconi, Rivera-Monteceneri (CH)

(73) Assignee: GTK TIMEK GROUP SA, Rivera-Monteceneri (CH)

( * ) Notice: Subject to any disclaimer, the term of this patent is extended or adjusted under 35 U.S.C. 154(b) by 33 days.

(21) Appl. No.: 15/314,711

(22) PCT Filed: Jun. 5, 2015

(86) PCT No.: PCT/IB2015/054255
§ 371 (c)(1),
(2) Date: Nov. 29, 2016

(87) PCT Pub. No.: WO2015/189751
PCT Pub. Date: Dec. 17, 2015

(65) Prior Publication Data
US 2018/0202725 A1    Jul. 19, 2018

(30) Foreign Application Priority Data

Jun. 9, 2014   (IT) .............................. RM2014A0300

(51) Int. Cl.
*F28F 5/00*     (2006.01)
*F28F 5/02*     (2006.01)
(Continued)

(52) U.S. Cl.
CPC .................. *F28F 5/02* (2013.01); *B05D 1/30* (2013.01); *B05D 7/146* (2013.01); *B29C 39/10* (2013.01);
(Continued)

(58) Field of Classification Search
CPC .. F28F 5/02; F28F 19/04; B29C 39/10; B05D 1/30; B05D 7/14; B65H 27/00; F26B 13/18
See application file for complete search history.

(56) References Cited

U.S. PATENT DOCUMENTS 3,080,150 A * 3/1963 Gross ..................... D06C 15/08
159/11.1
3,137,926 A * 6/1964 Alfred .................. B21C 37/207
29/890.048
(Continued)

FOREIGN PATENT DOCUMENTS

DE     102012104462    11/2013
WO     2004-039588     5/2004

OTHER PUBLICATIONS

International Search Report, dated Sep. 2, 2015, from corresponding PCT application.

*Primary Examiner* — Travis C Ruby
*Assistant Examiner* — Harry E Arant
(74) *Attorney, Agent, or Firm* — Nixon & Vanderhye

(57) ABSTRACT

A thermal roller (1) includes: a cylindrical body (2) extending along a longitudinal direction (X-X), the cylindrical body (2) including at least one inner tubular element (3) and at least one outer tubular element (4) that is concentrically arranged around the inner tubular element (3), the inner tubular element (3) includes an outer diameter d and the outer tubular element 4 includes an inner diameter D, being D>d; two hubs (6), each arranged at one end of the cylindrical body (2); at least one heat-exchange chamber (10) realized between the inner tubular element (3) and the outer tubular element (4). The roller includes: a coating layer (11) for the inner tubular element (3) made of plastics, and at least one helical channel (13) between the coating layer (11)

(Continued)

and the outer tubular element (4). The helical channel (13) is realized at least partially in the coating layer (11).

16 Claims, 5 Drawing Sheets

(51) Int. Cl.

| | |
|---|---|
| B65H 27/00 | (2006.01) |
| F26B 13/18 | (2006.01) |
| B41F 13/22 | (2006.01) |
| B41F 23/04 | (2006.01) |
| D06B 23/02 | (2006.01) |
| D21G 1/02 | (2006.01) |
| B05D 1/30 | (2006.01) |
| B05D 7/14 | (2006.01) |
| B29C 39/10 | (2006.01) |
| F28F 19/04 | (2006.01) |
| F28F 21/06 | (2006.01) |
| F28D 7/02 | (2006.01) |
| B29K 705/00 | (2006.01) |
| B29L 31/00 | (2006.01) |

(52) U.S. Cl.
CPC ............ *B41F 13/22* (2013.01); *B41F 23/042* (2013.01); *B41F 23/0479* (2013.01); *B65H 27/00* (2013.01); *D06B 23/028* (2013.01); *D21G 1/0266* (2013.01); *F26B 13/18* (2013.01); *F26B 13/183* (2013.01); *F28F 19/04* (2013.01); *B29K 2705/00* (2013.01); *B29L 2031/779* (2013.01); *B65H 2301/5143* (2013.01); *B65H 2301/5144* (2013.01); *B65H 2404/1361* (2013.01); *B65H 2404/1362* (2013.01); *F28D 7/026* (2013.01); *F28F 21/06* (2013.01)

(56) References Cited

U.S. PATENT DOCUMENTS

| | | | | |
|---|---|---|---|---|
| 3,425,488 | A | * | 2/1969 | Jarreby ................ B21B 27/08 159/11.1 |
| 4,030,540 | A | * | 6/1977 | Roma ................ F28F 9/0132 122/510 |
| 4,229,640 | A | * | 10/1980 | Castellani Longo ........ B23K 26/0823 219/121.6 |
| 5,133,403 | A | * | 7/1992 | Yokono ............. H01L 23/3733 165/185 |
| 5,983,993 | A | | 11/1999 | Watson et al. |
| 6,032,725 | A | * | 3/2000 | Marschke ............ D21F 5/028 165/89 |
| 7,717,039 | B2 | * | 5/2010 | Becker ................ B41F 31/002 101/216 |
| 2006/0096745 | A1 | | 5/2006 | Cox |
| 2013/0266808 | A1 | * | 10/2013 | Tyson ................ D21F 3/08 428/383 |

* cited by examiner

THERMAL ROLLER AND PRODUCING PROCESS

FIELD OF THE INVENTION

The present invention concerns a thermal roller and the respective process for the production thereof.

KNOWN ART

Thermal rollers have very wide industrial applications, for example thermal rollers operate in modifying (increasing or decreasing) the temperature of a film (made of paper, PVC, aluminum, fabric, etc.) they are in contact with. Heat transfer mainly happens by conduction, i.e. by contact between the film and the roller. The roller operation can be accepted when the temperature difference between the two film sides is lower than 1° C.

For this purpose, usually thermal rollers are constituted by a cylindrical body provided with one heat-exchange chamber and one inlet and one outlet for a thermal fluid circulating in a closed circuit provided with a system pumping and cooling/heating the thermal fluid coming/being delivered from/to the roller. The inlet and the outlet of the thermal fluid are obtained in the hubs arranged at the opposite ends of the cylindrical body, a hub generally having the inlet and the other one the outlet. Anyway, there are applications in which the inlet and the outlet of the thermal fluid are made in the same hub.

The thermal fluid is usually water, or else water additivated with glycol.

There are a lot of different ways to implement the heat-exchange chamber, for example the so-called simple chamber is known, i.e. a chamber whose annulus section is obtained in the interspace between the inner and the outer bodies.

The Applicant noticed that, due to the rolling of the roller, the thermal fluid tends to remain always in the lower part of the heat-exchange chamber. In other terms, the thermal fluid inside the heat-exchange chamber moves with no defined path.

This embodiment of the heat-exchange chamber can generate thermal inhomogeneity (cooling/heating which are not constant and homogeneous).

Another example of the heat-exchange chamber is the so-called spiral chamber.

The spiral heat-exchange chamber is made by winding along a helical path, on the steel inner tube of the cylindrical body, a preferably round bar still made of steel. The bar is then fastened to the inner tube by welding.

Then a channel is made, having a helical path extending for the whole longitudinal extent of the roller between the inner tube and the outer tube.

Therefore, the thermal fluid in the heat-exchange chamber is forced to follow the helical path. The helical path of the thermal fluid allows a homogeneous flow of the fluid itself and, consequently, the thermal distribution is surely more homogeneous than thermal rollers with a simple chamber.

However, the Applicant observed that the roller part closest to the inlet hub can have thermal gradient greater with respect to the roller part next to the outlet hub. This because the fluid next to the outlet is surely heater than that at the inlet, therefore decreasing the thermal gradient.

In order to solve this problem a thermal roller provided with a spiral chamber having two windings has been proposed.

In this case, the heat-exchange chamber has two ducts with parallel helical paths. This embodiment is exploited to have opposing flows: the fluid is divided in two after the inlet hub, a part runs directly to a first helical channel, the other one reaches the other hub through an inner duct, then flowing into the second helical channel (that one being still empty). In this way two opposing flows, coming from the two ends, cross the thermal roller. The great advantage of this embodiment is the evenness of the thermal distribution.

However, the Applicant observed that this type of thermal rollers can be subject to rust and correspondingly be rust eaten, furthermore they have a complex and expensive production process.

Therefore, the Applicant posed itself the problem of implementing a thermal roller having the same advantages of thermal rollers with spiral heat-exchange chamber equipped with one, two or more windings, but at the same time not allowing the rust formation and the respective corrosion phenomena.

Furthermore, the Applicant posed itself the problem of implementing a thermal roller being simple to build and assemble, not requiring fastening elements structurally complex between the spiral fulfilling the channel and the inner cylindrical body.

The Applicant posed itself also the problem of implementing a thermal roller not requiring the implementation of the spiral with strict tolerances in order to allow a correct coupling between the spiral and the outer cylindrical body.

The Applicant posed itself also the problem of implementing a process of producing the thermal roller which is simple and inexpensive.

SUMMARY OF THE INVENTION

Therefore, in its first aspect the invention concerns a thermal roller comprising:
- a cylindrical body extending along a longitudinal direction (X-X); said cylindrical body comprising at least one inner tubular element and at least one outer tubular element that is concentrically arranged around said inner tubular element; said inner tubular element comprises an outer diameter d and said outer tubular element comprises an inner diameter D, being D>d;
- two hubs, each arranged at one end of the cylindrical body;
- at least one heat-exchange chamber realized between said inner tubular element and said outer tubular element;
- characterized by comprising a coating layer for said inner tubular element made of plastics;
- at least one helical channel between said coating layer and said outer tubular element;
- said coating layer comprises at least one rib arranged along a helical path around said longitudinal direction (X-X); said at least one rib being made in one piece with the coating layer;
- said helical path being made at least partially in said coating layer so that said at least one rib forms the side walls of said helical path.

In the scope of the present invention:
- with "longitudinal direction" or "longitudinally" is meant a direction generically facing the direction of main extension of the roller, the longitudinal direction usually coincides with the rotation axis of the roller itself.
- with "radial direction" or "radially" is meant a direction, or with a direction, orthogonal with respect to the longitudinal axis of the roller, which is arranged along a radius starting from the rotation axis of the roller.

with "counter-inclined", referred to two inclined planes, surfaces, walls, is meant that the two planes, surface, walls all have the same inclination, in terms of absolute value but with opposite sign, with respect to an axis interposed therebetween.

with inclination angle of the helix, is meant the angle formed by the helix tangent, therefore the rib tangent, with a plane perpendicular to the axis of the cylindrical body.

The present invention, in the afore said aspect, may have at least one of the favorite features described hereinbelow.

Advantageously, the helical path of the rib is defined by the inclination angle $\beta$ of the helix; said $\beta$ angle being comprised between 0° and 90°, limits included.

Advantageously, the coating layer made of plastics has a minimum thickness s greater than 0.5 mm.

Preferably, each rib has such a height h in the radial direction to abut against the inner surface of the outer tubular element.

Conveniently, said height h in the radial direction of the rib is greater than, or equal to, (D−(d+2s))/2.

Alternatively, said height h in the radial direction of the rib can be smaller than (D−(d+2s))/2, above all if the thermal rollers have a longitudinal extent greater than 1000 mm.

Preferably, each rib has a shaped section that is tapered while radially leaving the axial direction X-X.

Conveniently, said inner tubular element comprises two plug elements fastened at its ends.

Preferably, the coating layer has two portions extending beyond the inner tubular element, preferably in the longitudinal direction.

Advantageously, each plug element is coupled with a hub so that to make a seat for the portion of the coating layer extending preferably in the longitudinal direction (X-X) beyond the inner tubular element, said seat being shaped to close the portion of the coating layer in abutment between said hub and said plug element. According to another aspect the present invention concerns a process for producing a thermal roller as previously described.

The process comprises the following steps:
tailoring the inner tubular element;
combining two plug elements at the ends of said inner tubular element;
covering said inner element with a coating thickness made of plastics;
removing a part of the plastics to obtain at least one helical channel extending in the direction of the longitudinal axis of said inner tubular element;
providing said outer tubular element;
combining said outer tubular element with said inner tubular element;
providing and combining two hubs with said outer and inner tubular elements.

Advantageously, the step of covering said inner tubular element with a coating thickness made of plastics is carried out by fitting a sleeve made of plastics on the inner tubular element.

Alternatively, the step of covering said inner tubular element with a coating thickness made of plastics is carried out by casting the plastics onto said inner tubular element in a mould.

Alternatively, the step of covering said inner tubular element with a coating thickness made of plastics is carried out by moulding the plastics onto said inner tubular element in a mould.

Alternatively, the step of covering said inner tubular element with a coating thickness made of plastics is carried out by ribbon flow technology.

Alternatively, the step of covering said inner tubular element with a coating thickness made of plastics is carried out by rubber coating.

Alternatively, the step of covering said inner tubular element with a coating thickness made of plastics is carried out by winding the plastics on the inner tubular element and subsequently curing.

Preferably, the step of removing a part of the plastics is carried out by turning work through at least one shaped tool.

Advantageously, said at least one shaped tool is heated.

Preferably, said at least one shaped tool is heated by induction.

Alternatively, the step of removing a part of the plastics is carried out by grinding process through at least one grinding wheel.

BRIEF DESCRIPTION OF THE DRAWINGS

Further characteristics and advantages of the invention will be more evident from the detailed description of some preferred embodiments, but not exclusive, of a thermal roller according to the present invention.

Such a description will be hereinafter explained referring to the attached drawings, provided for purposes of illustrations only, and thereby not limitative, wherein.

DETAILED DESCRIPTION OF EMBODIMENTS OF THE INVENTION

Figure 1:
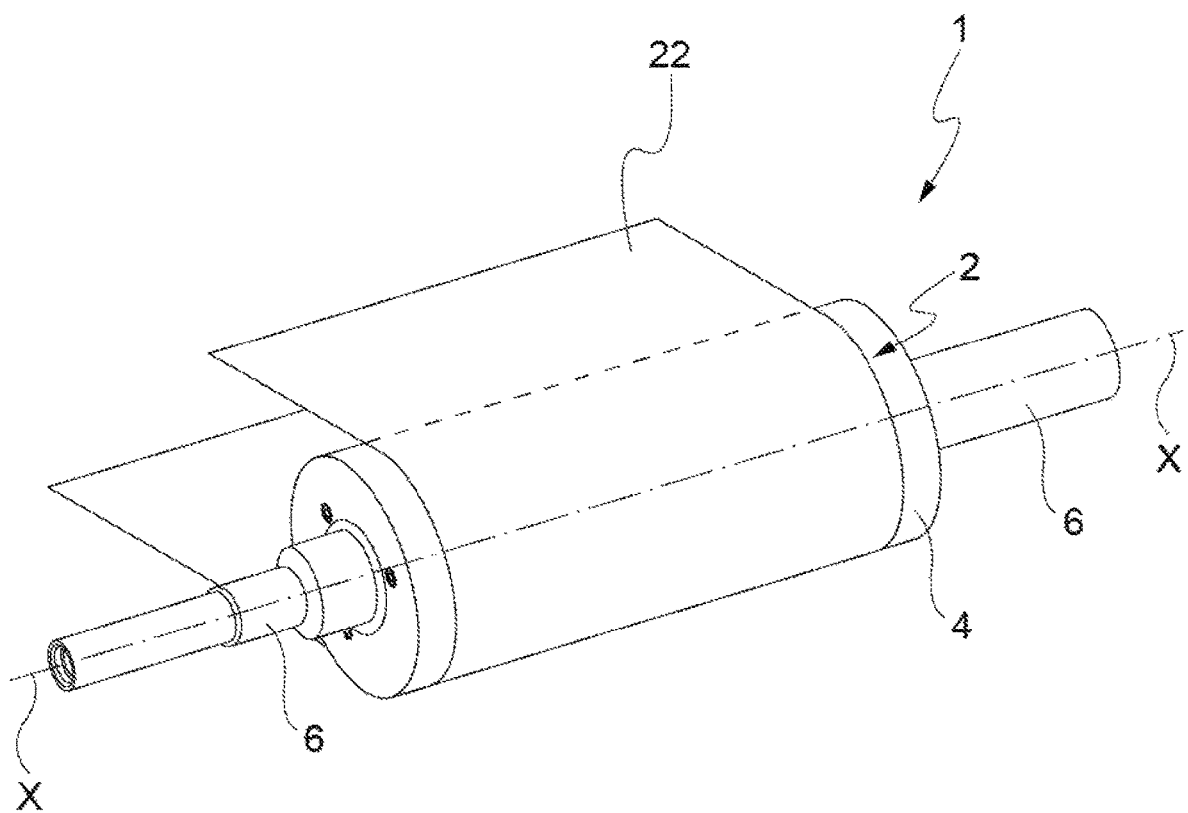
FIG. 1 is a perspective schematic view of a thermal roller according to the present invention.
Figure 2:
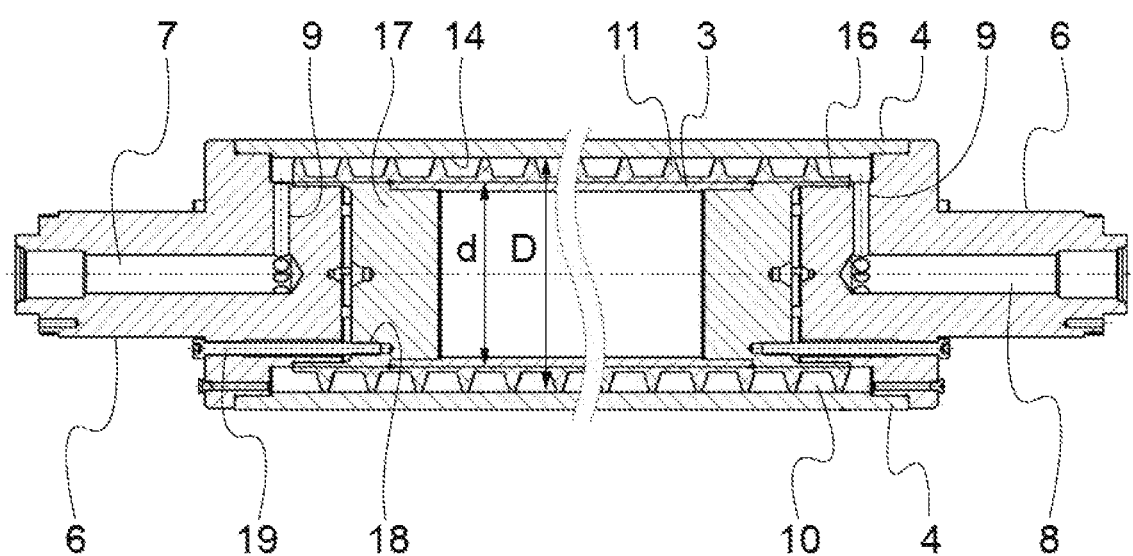
FIG. 2 is a schematic sectional view of the thermal roller of FIG. 1.
Figure 3:
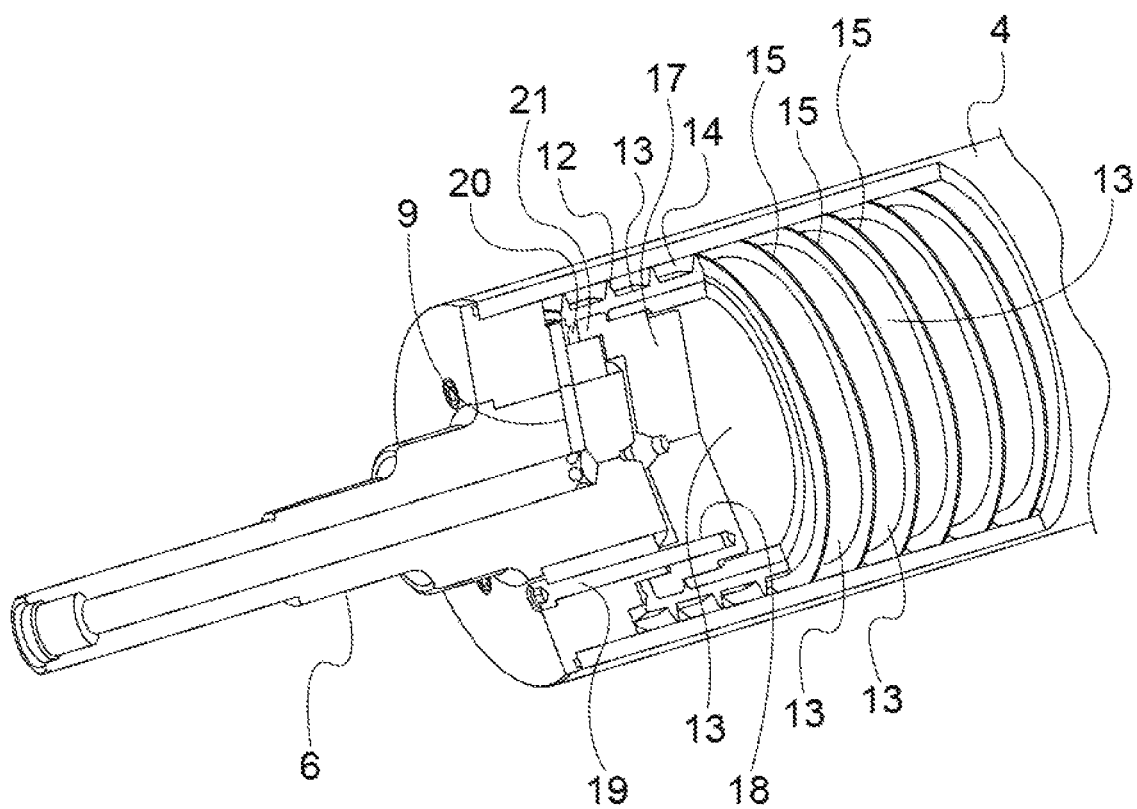
FIG. 3 is a partially sectional perspective view of a portion of the roller of FIG. 1.

Referring to FIGS. 1-4, a thermal roller according to the present invention is identified with the reference numeral 1.

Referring to the embodiment shown in figures, the thermal roller 1 is constituted by a cylindrical body 2 extending along a longitudinal direction X-X. The cylindrical body 2 has an inner tubular element 3 and an outer tubular element 4 that is concentrically arranged around the inner tubular element 3.

The outer tubular element 4 is the element contacting the film 22 to be cooled/heated.

The inner tubular element 3 and the outer tubular element 4 have substantially circular sections. In detail, the inner tubular element 3 has an outer diameter d and the outer tubular element 4 has an inner diameter D, being D>d.

At the end of the cylindrical body 2 there are two hubs 6, each arranged at one end of the cylindrical body 2. The hubs 6 close the outer tubular element 4.

The hubs 6 are shaped to allow the motion of the fluid from/to a heat-exchange chamber 10 obtained between the inner tubular element 3 and the outer tubular element 4, better described hereinafter.

The hubs 6 further have the function of keeping in position the outer tubular element 4 and the inner tubular element 3 and to allow the thermal roller itself to be positioned in the machine, at the ends of the stems/shanks there are seats for accommodating the bearings (not shown in the figure).

Both the outer tubular element 4 and the inner tubular element 3 are supported by hubs 6.

The outer tubular element 4 is keyed on the hubs 6 and, consequently, sustained by the latter. An O-ring gasket or the addition of specific sealing mastic, not shown in figures, prevents the fluid from outflowing into the area where the hub 6 contacts the outer tubular element 4. The hubs 6 are generally made of metal material. The hubs 6 can be obtained by turning and grinding works.

Conveniently, the inner tubular element 3 comprises two plug elements 17 fastened at its ends. The plug elements 17 have the function of closing the inner tubular element 3 and allowing the coupling with the hubs 6.

To allow the coupling with the hubs 6, each plug elements 17 has a housing seat 18 for at least one fastening element 19, such as a fastening screw.

The plug elements 17 are usually made of metal by turning and grinding works. The plug elements 17 are assembled by interference on the inner tubular element 3 and then welded.

The thermal roller 1 is in fluidic communication with a preferably closed circuit, the latter comprising a pumping system and a system for cooling/hearing a thermal fluid coming/being delivered from/to the thermal roller 1. The closed circuit is not shown in figures.

In the embodiment shown in figures, a hub 6 has the inlet 7 for the thermal fluid, whereas the other hub 6 has the outlet 8 for the thermal fluid.

According to another embodiment not shown in figures, a hub 6 can comprise both the inlet 7 and the outlet 8 of the thermal fluid.

The inlet 7 and the outlet 8 of the thermal fluid, through two radial ducts 9, are in fluidic communication with a heat-exchange chamber 10 obtained between the inner tubular element 3 and the outer tubular element 4.

At the heat-exchange chamber 10 and substantially for the whole extent in the longitudinal direction X-X of the inner tubular element 3, there is a coating layer 11 made of plastics.

The plastic material of coating layer 11 can be selected from a thermoplastic material, a thermosetting material, an elastomeric material or a combination thereof. Examples suitable of thermoplastic materials are: polyethylene (HDPE/LDPE), polystyrene (PS); polyethylene terephthalate (PET); polypropylene (PP); polyamide (PA, Nylon); celluloid; polylactic acid.

On the contrary, examples of thermosetting materials suitable for the purpose are: phenol formaldehyde resins; epoxide resins, vinyl ester resins.

At last, examples of elastomeric materials are: SBR, NBR, EPDM, NR, CR, Silicone. The coating layer 11 is like a cylindrical sheath having a minimum thickness in the radial direction. The minimum thickness s is preferably smaller or equal to 0.5 mm.

The Applicant believes that a minimum thickness s lower than 0.5 mm would lead to a poor insulation of the heat-exchange chamber 10 with respect to the inner tubular element 3.

Preferably, the minimum thickness s is comprised in the range 0.5 to 500 mm, limits included.

The coating layer 11 made of plastics has two ending portions 20 extending in the longitudinal direction X-X beyond the inner tubular element 3.

In detail, the coating layer 11 made of plastics has at its own end two annular portions 20 extending beyond the longitudinal direction X-X of the inner tubular element 3. The annular portions 20 are bent radially towards the inside of the inner tubular element 3 and are housed in a seat 21 made between each plug element 17 and a hub 6.

The seat 21 is made so that the annular portion 20 of the coating layer 11 extending in the longitudinal direction X-X beyond the inner tubular element 3, when the plug element 17 is coupled with the respective hub 6, are closed in abutment between a hub 6 and a plug element 17.

The coating layer 11 made of plastics has at least one rib 12 extending along a helical path around the longitudinal direction X-X substantially for the whole extent of the inner tubular element 3. Said rib 12 is made in one piece with the coating layer 11. In other terms, there are no fastening elements between the coating layer and the rib 12.

The helical path of the rib 12 is defined by the inclination angle $\beta$ of the helix. Such an angle $\beta$ is comprised between 0° and 90° and can varies along the longitudinal extent X-X of the same path.

The rib 12 has such a height in the radial direction h to abut against the radially inner surface 14 of the outer tubular element 2 so that a helical channel 13, arranged between the coating layer 11 and the outer tubular element 2, can be realized. In other terms, the height h in the radial direction of the rib 12 is greater than, or equal to, $(D-(d+2s))/2$.

According to another embodiment not shown in figures, the height h in the radial direction of the rib 12 can be smaller than $(D-(d+2s))/2$, above all if the thermal rollers have a longitudinal extent greater than 1000 mm.

The helical channel 13 is then realized at least partially in the coating layer 11 and, according to this first embodiment, between two coils 15 or windings adjacent in the longitudinal direction of the rib 12.

Figure 4:
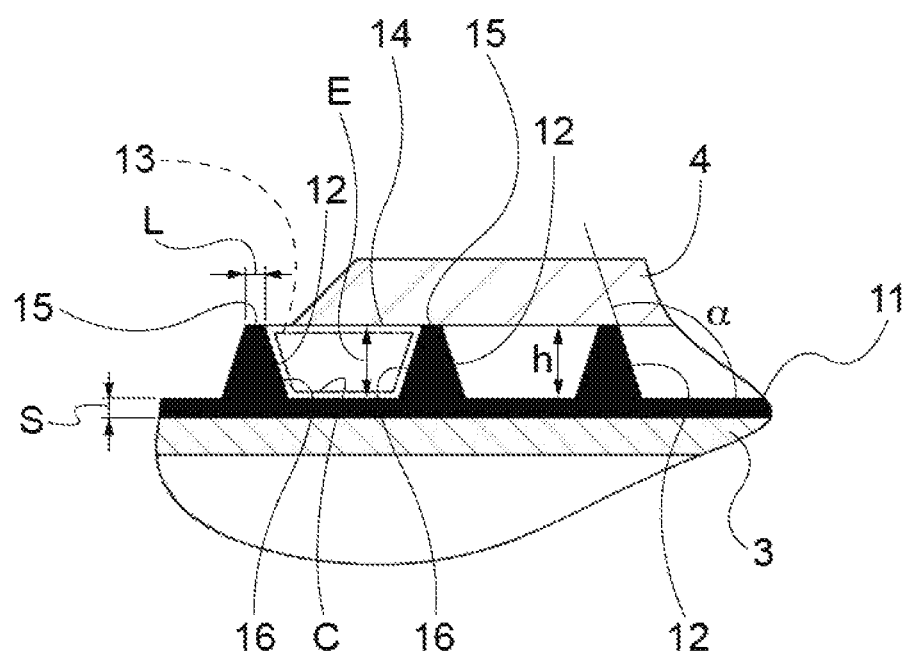
FIG. 4 is an enlarged sectional view of a portion of the thermal roller of FIG. 1.
Figure 5:
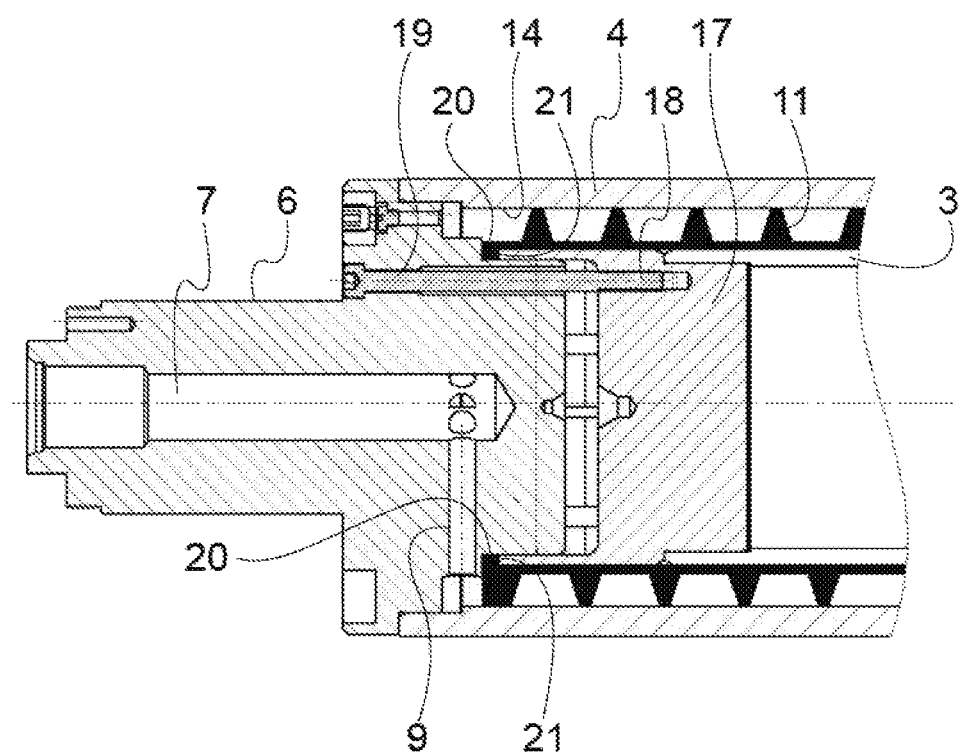
FIG. 5 is another schematic sectional view of the thermal roller of FIG. 1.

In other terms, according to this first embodiment the section of the helical channel 13, depicted as a dashed line in FIG. 4, is delimited in the longitudinal direction by two walls 16 facing the two adjacent coils 15 or windings of the rib 12 and, in the radial direction, is delimited above by the radially inner surface 14 of the outer tubular element 2 and underneath between the coating portion between the two longitudinally adjacent coils 15.

The section of the helical channel 13 has a height E comprised between 0.5 and 500 mm, limits included.

Preferably, the passage section of the helical channel 13, as better shown in FIG. 4, has a minimum width C comprised between 0.5 and 1000 mm, limits included. The passage section of the helical channel 13 is calculated in the basis of the needed thermal gradient with the possibility of achieving such a turbulent motion of the thermal fluid to facilitate the heat exchange. Moreover, the passage section of the helical channel 13 can not be constant by having narrowings to aid the turbulent motion of the fluid. These narrowings can be made with reliefs, projections, humps present on the surface of the helical channel 13.

Still referring to the embodiment shown in figures, each rib 12 has a shaped section that is tapered while radially leaving the longitudinal direction X-X.

Preferably, each rib 12 has a minimal width L arranged at the top of the rib 12 itself and a maximum width arranged in a position spaced from the top of the said rib 12.

The minimum width L of the rib 12 can be comprised between 0 and 100 mm.

The rib 12 further has two opposite and inclined walls, each inclined wall 16 having an α angle whose absolute value is comprised in the range 90 to 180°, preferably 100° to 170°, limits included.

The coating layer 11 made of plastics can have more than one rib 12 extending along a helical path around the longitudinal direction X-X substantially for the whole extent of the inner tubular element 3. Higher is the number of ribs 12 extending along a helical path, higher is the number of formed helical channels 13.

In a preferred embodiment not shown in figures there are two ribs 12 extending parallel along a helical path and, consequently, two helical channels 13 for the passage of the thermal fluid.

In this case the helical channels 13 extend helically and parallel along the longitudinal direction X-X so that two adjacent coils 15 of a first rib 12 are interspaced by a coil 15 of a second rib 12.

Also more than two ribs 12 and, consequently, more than two helical channels 13 can be provided.

The thermal roller according to the present invention can be made by a process as described hereinafter.

At first, the tailored inner tubular element 3 is provided. The inner tubular element 3 usually comprises a metal core, preferably obtained by turning and grinding works. Alternatively, the inner tubular element 3 can comprise a core made of composite material, such as for example carbon fiber.

The metal core is constituted by a tube at the ends of which two plug elements 17 are mounted.

Usually the plug elements 17 are disc-shaped and, preferably, are made by turning and grinding works.

The plug elements 17 are assembled by interference on the inner tubular element 3 and then welded. Function of the plug elements 17 is to close the inner tubular element 3 and (then) to fit on the outer hubs 6.

At this point, a coating layer 11 made of plastics is applied on the inner tubular element 3.

The coating layer 11 of plastics can be applied on the inner tubular element 3 in different ways.

According to a first embodiment, the step of covering said inner tubular element 3 with a thickness made of plastics is carried out by fitting a sleeve made of plastics on the inner tubular element 3.

Preferably, the sleeve is fitted by interference on the inner tubular element 3. Alternatively, the step of covering said inner tubular element 3 with a thickness made of plastics is carried out by casting the plastics onto the inner element in an apposite mould.

Still according to an alternative embodiment, the step of covering the inner tubular element 3 with a thickness of plastics is carried out by ribbon flow technology.

At the end, still according to an alternative embodiment, the step of covering the inner tubular element 3 with a thickness of plastics is carried out by rubber coating. Through this method the rubber is applied by winding it on the core of a rubber band coming from a drawing step. The method is then completed by a curing cycle in autoclave.

In each case the inner tubular element 3 is preferably covered with the coating layer 11 made of plastics so that the latter protrudes from both the ends in the direction of the longitudinal axis X-X for at least one length, this length that realizes an annular portion is radially bent towards the longitudinal axis X-X so that to not abut against the plug element 17 and the hub 6, thereby serving as a gasket and insulating the helical channel 13 (made later) from the areas not passed by the liquid.

Once the inner tubular element 3 has been covered with the coating layer 11 made of plastics, the working of the latter proceeds in order to obtain at least one helical channel 13 extending in the direction of the longitudinal axis X-X of the inner tubular element 3. This working can be achieved mainly in two ways.

According to a first embodiment, said at least one helical channel 13 is obtained through a step of removing plastic material by a shaped tool.

The shape of the tool is a function of the section of the helical channel 13 to be obtained. Such a tool, adequately fastened, is heated by induction: the combination of these two parameters (sharpening and heating) allows achieving an accurate cut also only in one time.

Alternatively, said at least one helical channel 13 can be obtained by removing the material through a grinding wheel. In this case, the grinding wheel provides for the function of the hot cutting tool by removing the material through abrasion.

At this point an outer tubular element 4 is provided, which can be used in parallel with or before the preceding steps. The inner tubular element 4 is constituted by a generally metal core, preferably obtained by turning and grinding works. Alternatively, the outer tubular element 4 can be made of composite material, such as for example carbon fiber.

The outer tubular element 4 is the element contacting the film 22 and, for this reason, its roughness can vary depending on the grip to be obtained for carrying the film 22. Possible surface treatments (e.g., chrome plating, nickel plating, anodic oxidation, plasma coating, zinc coating, etc.) can be carried out in order to protect the outer tubular element 4 from corrosive attacks and to affect the contact with the film 22 and the respective heat transfer.

At this point, the outer tubular element 4 is fitted on the inner tubular element 3 provided with the coating 11 in which said at least one helical channel 13 has been obtained.

The rib 12 usually has a diameter greater than the inner diameter of the outer tubular element 4, during the assembling this forces the rib 12 to loose thereby bending in the direction opposite to the insertion direction of the coating layer 11 on the outer tubular element 4. Reaction forces, generated by the bending of the rib 12 to the inside of the outer tubular element 4, assure the hermetic seal of the contact between the rib and the outer tubular element 4. In this way, when operating, the fluid flows along the spiral channel thereby avoiding the same rib to be stepped over.

Furthermore, the little thickness of the rib allows almost the wholeness of the outer tubular element 4 to be in contact with the fluid, thereby assuring a homogeneous heat exchange.

Therefore, two hubs 6 are provided and associated. Also the hubs 6 can be made in parallel or before the preceding steps. The hubs 6, usually made of metal, are preferably obtained by turning and grinding works.

The hubs 6 are positioned at the plug elements.

The hubs 6 are generally made of metal material. They have the function of closing the outer tubular element 4, of keeping in position the inner tubular element 3 with said at least one helical channel 13 and of allowing the thermal roller itself to be positioned in the machine (at the ends of the stems/shanks of the hubs there are apposite seats for the bearings). Moreover, the inner drilling of the hubs 6 allows the fluid to pass from and towards said at least one helical channel 13. Such a drilling closes with a threading (right- or left-handed depending on the rotation way of the operating roller) necessary for the bearing of the hydraulic fittings.

Surface treatments are provided also for the hubs 6 (e.g. chrome plating, nickel plating, anodic oxidation, zinc coating, etc.). These surface treatments can be made in order to protect the hubs 6 from corrosive attacks.

The present invention has been described referring to some embodiments. To the embodiments herein represented in detail various modifications can be made, anyway remaining in the protection scope of the invention, defined by the following claims.

The invention claimed is:

1. A thermal roller comprising:
a cylindrical body extending along a longitudinal direction, said cylindrical body comprising at least one inner tubular element and at least one outer tubular element that is concentrically arranged around said inner tubular element, said inner tubular element comprises an outer diameter d and said outer tubular element comprises an inner diameter D, where D>d, the inner tubular element comprising two plug elements at ends thereof;
two hubs that are each arranged at one end of the cylindrical body;
at least one heat-exchange chamber between said inner tubular element and said outer tubular element;
a coating layer coating said inner tubular element made of a plastic material, the coating layer comprising two portions extending in the longitudinal direction beyond the inner tubular element such that the two portions extending beyond the inner tubular element are closed in abutment between a respective one of the two hubs and a respective one of the two plug elements;
at least one rib made of the plastic material of the coating layer and integrated with and extending from the coating layer thereby forming a unitary piece of the plastic material, the at least one rib being arranged along a helical path around the longitudinal direction; and
at least one helical channel between said coating layer and said outer tubular element;
wherein said helical path being made at least partially in said coating layer so that said at least one rib forms the side walls of said helical path.

2. The thermal roller according to claim 1, wherein said helical path of the rib is defined by an inclination angle β formed by the helix against the longitudinal direction of the roller, said β angle being comprised between 0° and 90°, limits included.

3. The thermal roller according to claim 2, each of the at least one rib has such a height h in the radial direction to abut against the inner surface of the outer tubular element.

4. The thermal roller according to claim 1, wherein each of the plug elements is coupled with a respective one of the hubs to make a seat for the portion of the coating layer extending in the longitudinal direction beyond the inner tubular element, said seat being shaped to close the portion of the coating layer in abutment between said respective hub and said respective plug element.

5. The thermal roller according to claim 1, wherein each of the at least one rib has such a height h in the radial direction to abut against the inner surface of the outer tubular element.

6. The thermal roller according to claim 1, wherein said coating layer made of plastics has a minimum thickness greater than 0.5 mm.

7. The thermal roller according to claim 1, wherein each of the at least one rib has a shaped section that is tapered while radially leaving the longitudinal direction.

8. The thermal roller according to claim 1, wherein each of the at least one rib has two opposite inclined walls, each inclined wall having an a angle whose absolute value is comprised in the range 90° to 180°.

9. A process for producing the thermal roller according to claim 1, the process comprising:
tailoring the inner tubular element;
combining the two plug elements at the ends of said inner tubular element;
covering said inner element with a coating thickness made of plastics;
removing a part of the plastics to obtain the at least one helical channel extending in the direction of the longitudinal axis of said inner tubular element;
providing the outer tubular element;
combining said outer tubular element with said inner tubular element; and
providing and combining the two hubs with said outer and inner tubular elements.

10. The process for producing the thermal roller according to claim 9, wherein said covering said inner tubular element with the coating thickness made of the plastic material is carried out by fitting a sleeve made of plastics on the inner tubular element.

11. The process for producing a thermal roller according to claim 9, wherein said covering said inner tubular element with the coating thickness made of the plastic material is carried out by casting the plastics onto said inner tubular element in a mold.

12. The process for producing a thermal roller according to claim 9, wherein said covering said inner tubular element with the coating thickness made of the plastic material is carried out by ribbon flow technology.

13. The process for producing a thermal roller according to claim 9, wherein said inner tubular element is covered with a rubber coating.

14. The process for producing a thermal roller according to claim 9, wherein said removing the part of the plastics is carried out by turning work through at least one shaped tool.

15. The process for producing a thermal roller according to claim 14, wherein said at least one shaped tool is heated.

16. The process for producing a thermal roller according to claim 9, wherein said removing the part of the plastics is carried out by a grinding process through at least one grinding wheel.

* * * * *